US012566536B2

(12) United States Patent
Jetmundsen et al.

(10) Patent No.: US 12,566,536 B2
(45) Date of Patent: *Mar. 3, 2026

(54) ELECTRONIC DOCUMENT MANAGEMENT SYSTEM WITH A CONTENT RECOMMENDATION INTERFACE

(71) Applicants: Atlassian Pty Ltd., Sydney (AU); Atlassian US, Inc., San Francisco, CA (US)

(72) Inventors: Henry Jetmundsen, Seattle, WA (US); Balazs Nagy, Mountain View, CA (US); Jerry Qing, Cupertino, CA (US); Swati Katta, Mountain View, CA (US); Rudra Saha, Jersey City, NJ (US); Shawn Cao, Mountain View, CA (US); Andrew Nelson, San Francisco, CA (US); Arnav Garg, Mountain View, CA (US); Frank Wang, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,368

(22) Filed: Jan. 12, 2024

(65) Prior Publication Data

US 2024/0152257 A1     May 9, 2024

Related U.S. Application Data

(63) Continuation of application No. 17/955,479, filed on Sep. 28, 2022, now Pat. No. 11,875,020.

(51) Int. Cl.
*G06F 3/0483* (2013.01)

(52) U.S. Cl.
CPC .................................. *G06F 3/0483* (2013.01)

(58) Field of Classification Search
None
See application file for complete search history.

(56) References Cited

U.S. PATENT DOCUMENTS 5,873,107 A     2/1999  Borovoy et al.
9,501,539 B2    11/2016 Joshi et al.
(Continued)

*Primary Examiner* — Mandrita Brahmachari
(74) *Attorney, Agent, or Firm* — Brownstein Hyatt Farber Schreck, LLP

(57) ABSTRACT

A computer-implemented method is disclosed. The method includes causing display, in a graphical user interface on a client device, of a page with a navigational panel including a selectable tree element having a hierarchical relationship to a current electronic page having its user-generated content being displayed in a content panel. The method includes identifying a set of candidate cards in which each card is associated with a respective electronic page and has a respective relatedness score. The method includes identifying a user profile in accordance with an authentication of an user operating the client device, and selecting, from the set of candidate cards, a subset of candidate cards satisfying permissions criteria based on permissions identified in the user profile. The method includes causing display of the subset of candidate cards within the content panel in accordance with the respective relatedness score for each card in the subset of candidate cards.

19 Claims, 9 Drawing Sheets

200b

(56)         References Cited

U.S. PATENT DOCUMENTS

| | | | |
|---|---|---|---|
| 10,540,404 B1 | 1/2020 | Dang et al. | |
| 11,435,873 B1 | 9/2022 | Sharma et al. | |
| 2005/0076311 A1 | 4/2005 | Kusterer | |
| 2006/0122859 A1 | 6/2006 | Feldman et al. | |
| 2006/0123337 A1 | 6/2006 | Koinuma et al. | |
| 2008/0301111 A1* | 12/2008 | Statchuk | G06F 16/334 |
| | | | 707/999.005 |
| 2008/0307352 A1 | 12/2008 | Chaudhri et al. | |
| 2009/0083314 A1 | 3/2009 | Maim et al. | |
| 2011/0043652 A1 | 2/2011 | King et al. | |
| 2012/0290910 A1* | 11/2012 | Kumar | G06F 16/972 |
| | | | 715/205 |
| 2013/0238783 A1* | 9/2013 | Alexander | G06F 16/954 |
| | | | 709/224 |
| 2013/0325463 A1 | 12/2013 | Greenspan et al. | |
| 2014/0019868 A1 | 1/2014 | Varian et al. | |
| 2014/0040238 A1 | 2/2014 | Scott et al. | |
| 2014/0108439 A1 | 4/2014 | Lamba et al. | |
| 2014/0280935 A1 | 9/2014 | Pearson et al. | |
| 2017/0070476 A1* | 3/2017 | Massoudi | G06Q 30/0241 |
| 2018/0088742 A1 | 3/2018 | Lee et al. | |
| 2018/0300324 A1 | 10/2018 | Ziraknejad et al. | |
| 2022/0100326 A1* | 3/2022 | Sukhyani | G06F 9/451 |

* cited by examiner

300

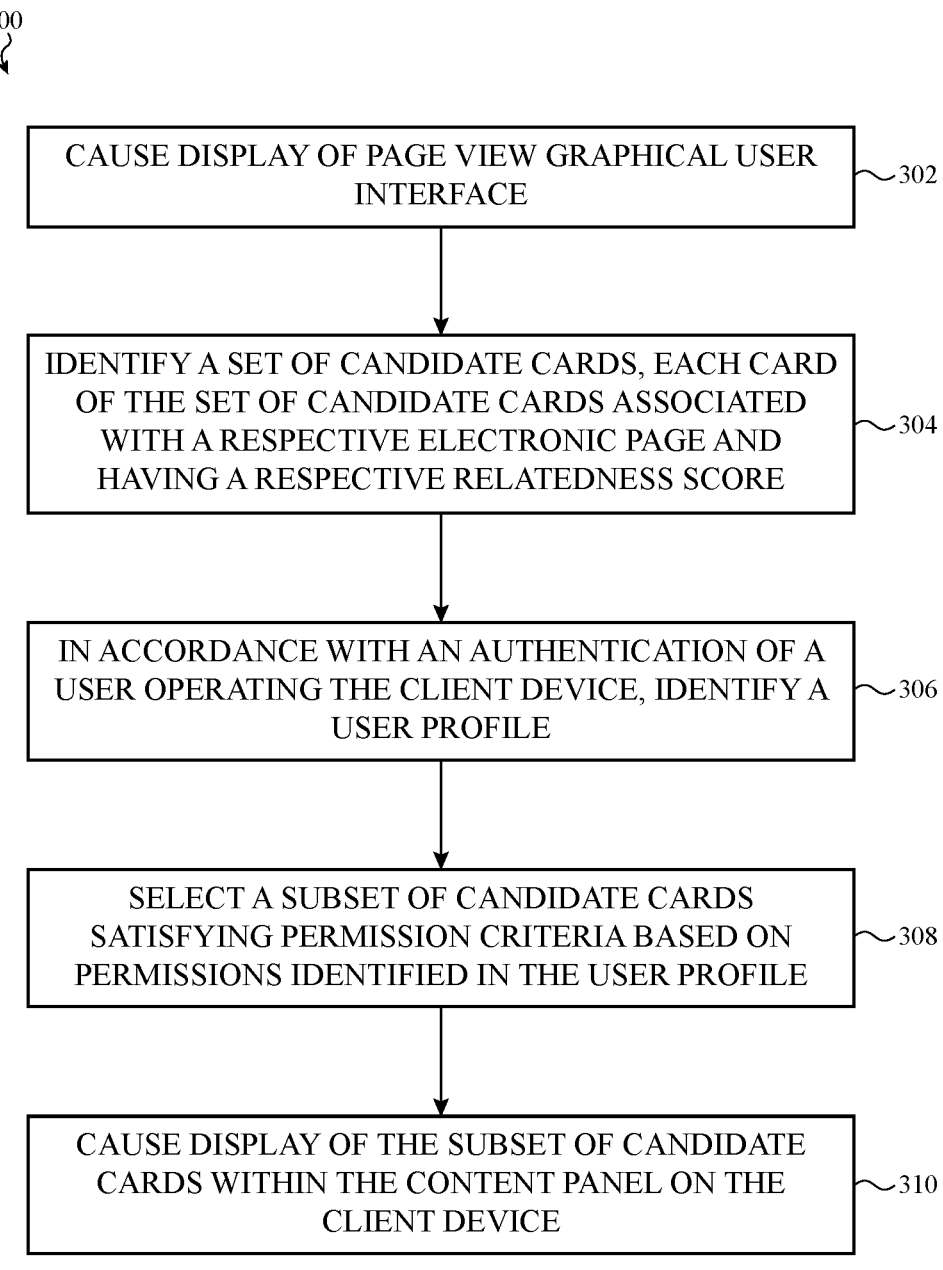

CAUSE DISPLAY OF PAGE VIEW GRAPHICAL USER INTERFACE ~302

IDENTIFY A SET OF CANDIDATE CARDS, EACH CARD OF THE SET OF CANDIDATE CARDS ASSOCIATED WITH A RESPECTIVE ELECTRONIC PAGE AND HAVING A RESPECTIVE RELATEDNESS SCORE ~304

IN ACCORDANCE WITH AN AUTHENTICATION OF A USER OPERATING THE CLIENT DEVICE, IDENTIFY A USER PROFILE ~306

SELECT A SUBSET OF CANDIDATE CARDS SATISFYING PERMISSION CRITERIA BASED ON PERMISSIONS IDENTIFIED IN THE USER PROFILE ~308

CAUSE DISPLAY OF THE SUBSET OF CANDIDATE CARDS WITHIN THE CONTENT PANEL ON THE CLIENT DEVICE ~310

*FIG. 3*

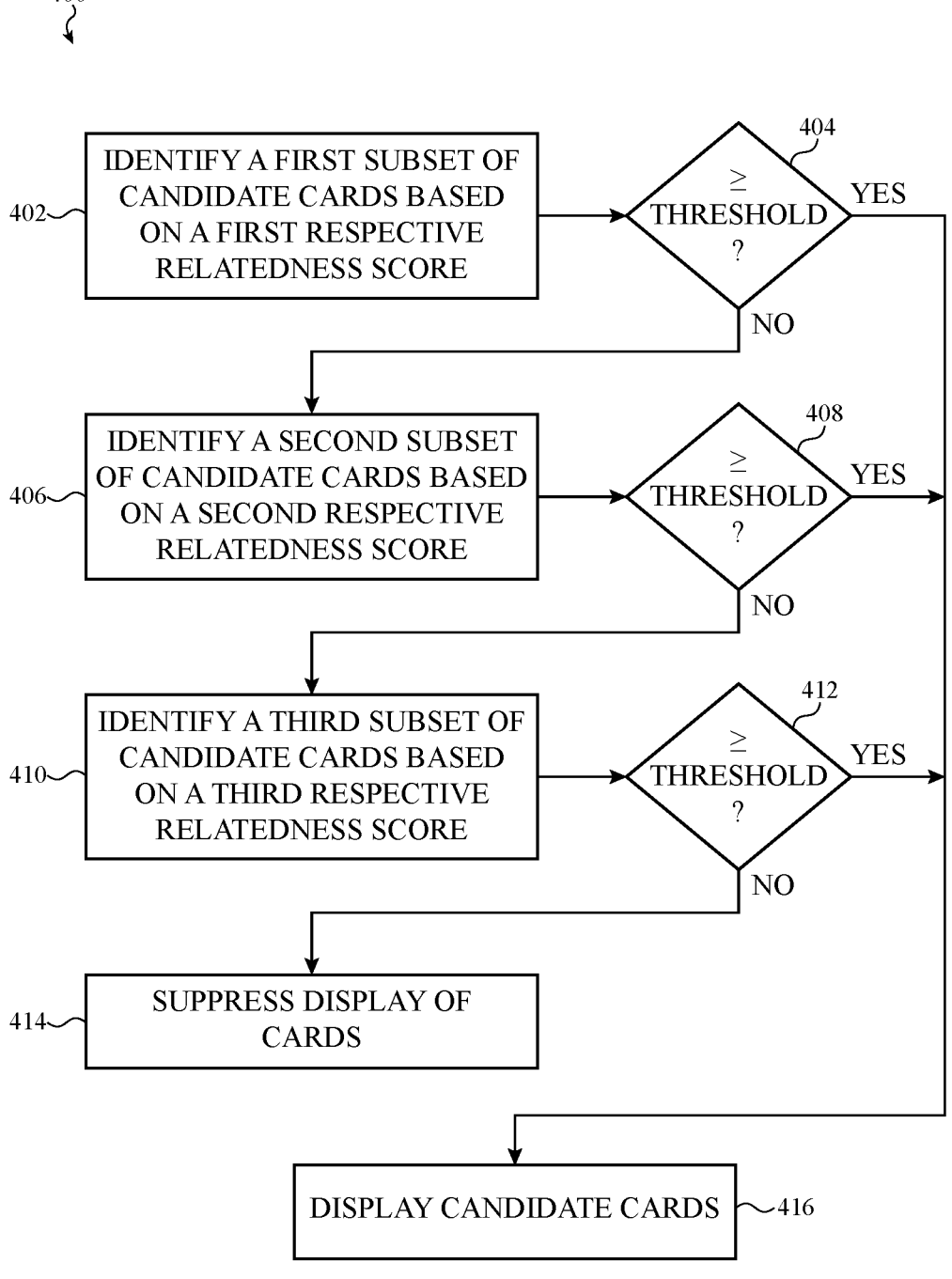

400

| 402 | IDENTIFY A FIRST SUBSET OF CANDIDATE CARDS BASED ON A FIRST RESPECTIVE RELATEDNESS SCORE |

404

≥ THRESHOLD ? — YES / NO

| 406 | IDENTIFY A SECOND SUBSET OF CANDIDATE CARDS BASED ON A SECOND RESPECTIVE RELATEDNESS SCORE |

408

≥ THRESHOLD ? — YES / NO

| 410 | IDENTIFY A THIRD SUBSET OF CANDIDATE CARDS BASED ON A THIRD RESPECTIVE RELATEDNESS SCORE |

412

≥ THRESHOLD ? — YES / NO

| 414 | SUPPRESS DISPLAY OF CARDS |

DISPLAY CANDIDATE CARDS ~416

*FIG. 4*

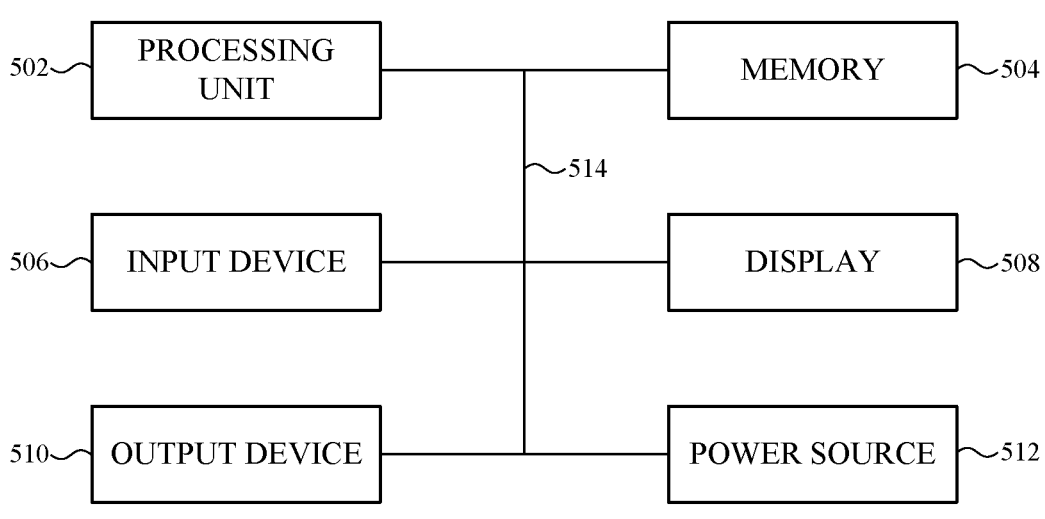
*FIG. 5*

ELECTRONIC DOCUMENT MANAGEMENT SYSTEM WITH A CONTENT RECOMMENDATION INTERFACE

CROSS-REFERENCE TO RELATED APPLICATION(S)

This application is a continuation patent application of U.S. patent application Ser. No. 17/955,479, filed Sep. 28, 2022 and titled "Electronic Document Management System with a Content Recommendation Interface," the disclosure of which is hereby incorporated herein by reference in its entirety.

FIELD

The described embodiments relate generally to a system and graphical user interface for managing and displaying electronic documents and pages. More particularly, the present embodiments relate to a system and interface for recommending content from within a document management interface.

BACKGROUND

Modern enterprises and collaboration platforms typically manage large volumes of electronic documents and other electronic content created by users of the platform. A user reviewing an electronic document or content on a particular topic, for example, finding an answer or a solution to a particular problem, may need to go through a large number of electronic documents or pages. The electronic documents or pages may be presented to a user based on a specific search query word, and, therefore, many electronic documents or pages presented to the user may be unrelated to the particular topic that the user is interested in. Further, various electronic documents or content on the collaboration platform are generated by different users, which may or may not be related to each other. Accordingly, some traditional collaboration systems may have content organizational schemes that make it difficult to discover relevant content.

SUMMARY

The embodiments and examples described herein are directed to computer systems and computer-implemented methods for managing and/or displaying electronic page content. As described herein, the system may include a backend configured to provide page content or other electronic content of a content collaboration platform over a computer network to a plurality of client devices. Each client device may be operating a web browser client application.

In one embodiment, at the web browser client application and in response to a request to view a page at a client device, the system may cause display of a page view graphical user interface on the client device. The page graphical user interface may include a content panel depicting user-generated page content of a current electronic page, and a navigational panel including a hierarchical element tree having an array of hierarchically arranged tree elements. Each tree element may have a hierarchical relationship to the current electronic page. Each tree element may be selectable to cause display of page content of a respective electronic page in the content panel. The system may further identify a set of candidate cards. Each card in the set of candidate cards may be associated with a respective electronic page and having a respective relatedness score. The respective relatedness score may increase in accordance with an increased proximity of a respective entry of the respective electronic page to an entry of the current electronic page in the array of hierarchically arranged tree elements, and in accordance with a decreased number of navigation events between a previous navigation to the respective electronic page and a navigation to the current electronic page. The system may further identify a user profile, and select, from the set of candidate cards, a subset of candidate cards satisfying permissions criteria based on permissions identified in the user profile. The user profile may be identified in accordance with an authentication of an user operating the client device. The system may further cause display of a portion of the subset of candidate cards within the content panel in response to the subset of candidate cards including two or more candidate cards. The subset of candidate cards may be displayed in accordance with the respective relatedness score for each card in the subset of candidate cards. Each displayed candidate card may be selectable to cause display of respective electronic content of the respective electronic page within the content panel of the graphical user interface.

In another embodiments, at the web browser client application and in response to a request to view an electronic document at a client device, the system may cause display of a graphical user interface on the client device. The graphical user interface may include a content panel depicting electronic content of a current electronic document, and a navigational panel including a hierarchical element tree having an array of hierarchically arranged tree elements. Each tree element may have a hierarchical relationship to the current electronic document. Each tree element may be selectable to cause display of electronic content of a respective electronic document in the content panel. The system may further identify a set of candidate cards. Each card in the set of candidate cards may be associated with a respective electronic document and having a respective relatedness score. The respective relatedness score may increase in accordance with an increased proximity of a respective entry of the respective electronic document to an entry of the current electronic document in the array of hierarchically arranged tree elements, and in accordance with a number of matching keywords between the respective electronic document and the current electronic document. The system may further identify a user profile, and select, from the set of candidate cards, a subset of candidate cards satisfying permissions criteria based on permissions identified in the user profile. The user profile may be identified in accordance with an authentication of an user operating the client device. The system may further cause display of a portion of the subset of candidate cards within the content panel in response to the subset of candidate cards including two or more candidate cards. The subset of candidate cards may be displayed in accordance with the respective relatedness score for each card in the subset of candidate cards. Each displayed candidate card may be selectable to cause display of respective electronic content of the respective electronic document within the content panel of the graphical user interface.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 3 depicts an example flow chart of a process for displaying cards in a graphical user interface.

FIG. 4 depicts an example flow chart of a process for displaying cards in a graphical user interface.

FIG. 5 depicts an example hardware for devices of the systems described herein.

The use of the same or similar reference numerals in different figures indicates similar, related, or identical items.

Figure 1:
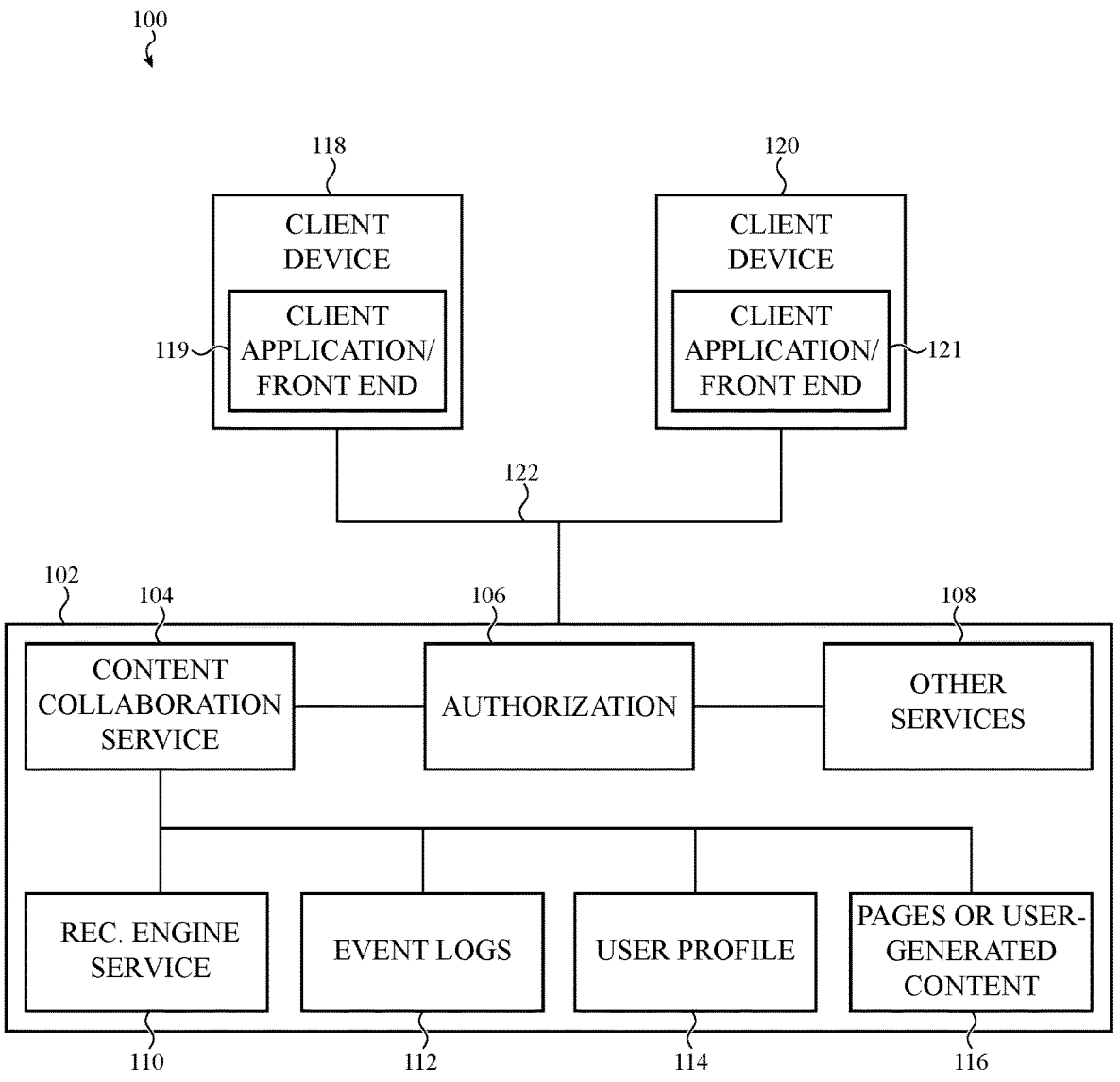
FIG. 1 depicts a system for providing content to client devices in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The systems and techniques described herein are directed to a content collaboration platform or other type electronic content management system that allows users to create and publish electronic content using a client application. In particular, the systems and techniques described herein may be applicable to content collaboration platforms that use a web browser client application to generate content creation and editing interfaces for creating electronic content and also content viewing interfaces for viewing the electronic content. The systems and techniques described herein are directed to identifying one or more documents, pages, or other electronic content that may be related to a particular document, page, or electronic content that a user is currently viewing on a client device, and recommending to the user while the user is still viewing the particular document, page, or electronic content. The recommendations are presented as cards or tiles within a content panel of the graphical user interface and are selectable to enable navigation to the respective document or page.

In some content collaboration platforms, a user may have access to a very large number of electronic documents or pages, which may be searched or navigated using functionality provided by the platform. However, in some cases, simple keyword searching or other traditional navigational techniques may not be sufficient to easily identify relevant documents or pages. Further, when potentially relevant content is found by the user, it may be difficult to easily navigate to other related pages or documents that may include similar subject matter but may otherwise have been omitted from a keyword search.

Embodiments described herein are directed to a graphical user interface for viewing and editing user-generated page or document content. The graphical user interface may enable document creation and document viewing from the same interface and may be toggled between a document view mode to a document edit mode in accordance with an authorized user having edit permissions for the document and/or the corresponding document space. The user-generated pages or documents may be organized in accordance with a hierarchical element tree, also referred to herein as a page tree. The graphical user interface may include a navigation pane having an array of hierarchically arranged tree elements that can be used to visualize the hierarchical element tree or page tree. Each element may include a short summary, which may correspond to a document title or other metadata associated with the document and may be selectable in order to cause content of the respective document to be displayed in an adjacent content panel. Each element of the hierarchical element tree or page tree may have a parent-chile relationship to other elements of the tree and the specific relationship or structure of the tree may be defined by a user having edit permissions for the corresponding document space.

As described herein, both the navigation pane and content panel may be presented as part of the graphical user interface. The content panel typically displays the electronic content associated with a current document or page and the navigation pane may display the corresponding tree element along with neighboring or adjacent elements of the tree. Within the content pane, an array of cards or tiles may be displayed in accordance with a recommendation engine operated by the platform. Specifically, a recommendation engine or service may select sets of candidate cards or tiles using a relatedness score that is computed for each card or tile. The relatedness score may be computed in order to both ensure a sufficient number of results are presented and that the presented results are likely to be relevant to the user browsing the current document or page. As described herein, the relatedness score may be a composite score that is based on both recent navigational events with respect to the current page and also proximity of the entry of the current page in the page tree to other entries in the page tree. In the event that an insufficient number of results are discovered or selected, the candidate score may be recomputed by omitting one of the various factors (e.g., navigational relatedness to other pages or proximity within the page tree). Additionally, the relatedness score may be boosted or increased in accordance with system user activity including, for example, likes, comments, or other feedback provided to respective documents or pages.

In accordance with embodiments described herein, the selected cards or tiles may be presented in accordance with a permissions scheme of an authenticated user. In this way, the recommendation engine or service may not be used to reveal electronic content that the user would not ordinarily be able to access or view. Thus, as described herein, the system may include or use an authorization service to authenticate a user, and generate or use a user profile to manage the permissions of a particular user. The permission scheme may also be used to enable other functionality including, for example, the ability to suppress display of particular cards or tiles or to suppress the use of the recommendation engine or service with respect to a particular page or document.

As described herein, the terms page or document may be used to refer to electronic content that is managed by the electronic document management system. The page or document may also be referred to as an electronic page or an electronic document and may include electronic content that is typically generated by a system user. The electronic content may include text entries, graphical objects, links, video clips, audio clips, and other user-generated content. As described above, each page or document may have a corresponding entry or element in a corresponding hierarchical element tree or page tree, which relates the page or document to other pages or documents within a particular document space. The system typically includes multiple documents spaces, each space having one or more hierarchical element trees or page trees. Each space may also have a distinct permissions scheme defining a set of users having edit, view, and share access.

These foregoing and other embodiments are discussed below with reference to FIGS. 1, 2A-2E, 3A-3B, 4, and 5. However, those skilled in the art will readily appreciate that the detailed description given herein with respect to these figures is for explanation only and should not be construed as limiting.

FIG. 1 depicts a simplified diagram of a system, as described herein. The system 100 is depicted as implemented in a client-server architecture or client-service architecture, but it may be appreciated that this is merely one example and that other communications architectures are possible. In accordance with the examples provide herein, the system 100 of FIG. 1 can be used to provide a series of interfaces to a document management system, page management system, content collaboration platform or other electronic content management system via a computer network. The architecture of system 100 allows for remote access of electronic content using either a dedicated client application (such as a web browser application, a mobile device application, or a native client application) to access backend servers, or a client application (such as a web browser application, a mobile device application, or a native client application) to access one or more web services offered by a backend system. As described herein, the system 100 may be used to create, manage, and display content for electronic pages or documents.

The networked computer system or system 100 of FIG. 1 depicts an example configuration in which multiple client devices 118, and 120 may access a host server 102 of a set of host servers via a computer network 122. The computer network 122 may include a distributed network which may include local networks, gateways, and networking services provided by one or more internet service providers. The client devices 118, and 120 are able to create, search, view and share content via the network 122 either directly or through the various services provided by the host server 102 of the set of host servers.

The client devices 118, 120 execute or operate respective example client applications 119, 121, which may include a dedicated client-side application or may be a web browser client application. The client applications 119, 121 may also be referred to herein as front end applications and may provide one or more graphical user interfaces for interfacing with the back end applications or services provided by the host server 102. The client devices 118, 120 typically include a display, processing unit, computer memory, and other hardware components. An example device including hardware elements is described below with respect to FIG. 5.

The host server 102 of the set of host servers may include multiple platform services, which may be part of a content collaboration platform. For example, the multiple platform services may include, but not limited to, a content collaboration service 104, a recommendation engine service 110, a page or document creation and management service, content wiki services, messaging and event feed services, and other collaboration or data management services 116. A platform service of the multiple platform services may be implemented as one or more instances of the platform service executing on one or more host servers of the set of host servers. The multiple platform services may also provide different services including, for example, issue tracking services for creating, managing, and tracking issues for software development, bug tracking, and/or information technology service management (ITSM) services.

As shown in FIG. 1, the system 100 includes a host server 102 of a set of host servers, which may be a host of multiple platform services. The host sever 102, which may use one or more virtual or physical computing resources (collectively referred in many cases as a "cloud platform"). In some cases, the set of host servers can be physically collocated or in other cases, each may be positioned in a geographically unique location.

The host server 102 of the set of host servers can be communicably coupled to one or more client devices by a network 122. Multiple example client devices are shown as the client devices 118, and 120. The host server 102 of the set of servers hosts services and/or other server components or modules to support infrastructure for one or more backend applications, each of which may be associated with a particular software platform, such as a documentation platform or an issue tracking platform. For example, the host server 102 may host a content collaboration service 104, an authentication/authorization service 106, a recommendation engine service 110, and other services 116. The host server 102 may also include an event log module 112, and a user profile module 114. The host server 102 may also have a local cache of pages of user-generated content 116.

The content collaboration service 104 may provide an interface to client devices 118, and 120 to the one or more backend applications, and/or software platforms, such as documentation platform or an issue tracking platform. The client devices 118, and 120 may be executing a frontend application that consumes services provided by the content collaboration service 104. Accordingly, a user of a client device 118, or 120 may create, edit, search, and/or view electronic documents, pages, or electronic content using the interface provided by the content collaboration service 104. By way of a non-limiting example, the interface provided by the content collaboration service 104 may be webservice based, such as a REpresentational State Transfer (REST) webservice. The electronic documents, pages, or electronic content may be transferred between a client device and a host server using one or more of JavaScript Object Notation (JSON), EXtensible Markup Language (XML), HyperText Markup Language (HTML), and/or a proprietary document format.

The content collaboration service 104 allows the user to create, edit, search, and/or view electronic documents, pages, or electronic content and may also be referred to herein as a document management system or page management system. The content collaboration service 104 may allow the user to create, edit, search, and/or view electronic documents, pages, or electronic content based on authentication and/or authorization of a user using the authentication/authorization service 106. The authentication/authorization service 106 may authenticate a user based on user credentials, which may include a username or other user identification, password or pin, biometric data, or other user-identifying information. The user credentials may be stored and tracked using a token, authentication cookie, or other similar data element.

Upon successful authentication/authorization of a user, the content collaboration service 104 may access a user profile module 114 to obtain a user profile associated with an authenticated user of a client device. The user profile associated with the user may suggest various permissions of a user for creating, editing, accessing, searching, and/or viewing various electronic documents, pages, or electronic content. The user profile associated with the user may also identify other details of the user, including but not limited to, a role of a user in an organization, one or more groups to which a user is a member, other users of the one or more groups to which the user is a member, one or more projects related to the user, one or more issues or tickets (managed by an issue tracking system) the user is assigned to, and so on. The user profile may include, but not limited to, user permission settings or profiles, and user history that may include user logs or event histories, system settings, administrator profile settings, content space settings, and other system profile data associated with the backend applications described herein and associated with the user.

Accordingly, the user of the client device may create, edit, access, search, and/or view electronic documents, pages, or electronic content based on permissions granted to the user based on the retrieved user profile. The other services 116 described herein may provide a user interface to other applications or services, for example, an issue tracking system, to create, edit, search, or view an issue or ticket on the issue tracking system. Thus, the content collaboration service 104 may generate electronic documents, pages, or electronic content which may also include data associated with one or more issues managed by the issue tracking system.

While the content collaboration service 104 is configured to render electronic documents, pages, or electronic content for display to the user, the content collaboration service 104 may also include in the content recommended content that is displayed as recommendation cards or tiles that are selectable to enable navigation directly to the recommended content. As described herein, the candidate cards or tiles may be selected in accordance with recommendations provided by the recommendation engine service 110. As described herein, the recommendation engine service 110 may be configured to compute or determine a relatedness score for a respective page or document with respect to a current page or document. The relatedness score, as described herein, may be determined based on recent navigation events, location of the respective elements within a page tree, or other factors that can be determined by the system.

The system may also include one or more event log modules 112, which may track and/or store user actions, system events, or other data generated in accordance with activity performed by the system users. Specifically, the event log module 112 may include navigation events that are generated in response to user selection or navigation to various page, documents, or other content on the system. The navigation events may be used to determine which pages have been navigated to by a user either before or after a particular page or document. In some cases, the navigation events are used to determine a set of pages or documents that have been navigated to or viewed by the user within a session or designated time frame. The user event log 112 may also be used to store other properties of a session including, for example, average dwell time for a page or document, user interactions with content including likes, comments, and other feedback, other application use or other user activity observed during a session or time period. As described herein, data stored and tracked by the event logs may be used to determine a relatedness score or other measure of relevance for a card, tile, or respective content.

The host server 102 may store electronic documents, pages, or electronic content in a local database, memory, or cache 108. However, the host server 102 may also store and/or access electronic documents, pages, or electronic content in a remote database, memory, or cache (for example, in a cloud environment). By way of a non-limiting example, electronic documents, pages, or electronic content stored in the local database, memory, or cache 108 may be user-generated content, content space data, content tree data, content metadata and other electronic content associated with the various backend applications described herein. The user-generated content may be stored as page objects, document objects, or other data elements.

FIGS. 2A-2E depict example views of a graphical user interface or a frontend application executing on a client device of a user. The graphical user interfaces (e.g., 200a-200e) provided by the frontend or client application may operate in one of a number of different modes. In a first mode, a user may create, edit or modify an electronic document, page, or electronic content. This mode or state of the graphical user interface may be referred to as an editor user interface, content-edit user interface, a page-edit user interface, or document-edit user interface. In a second or other mode, the user may view, search, comment on, or share the electronic document, page, or electronic content. This mode or state of the graphical user interface may be referred to as an viewer user interface, content-view user interface, a page-view user interface, or document-view user interface. The graphical user interface may be implemented in a web browser client application using HTML, JavaScript, or other web-enabled protocol.

Figure 2A:
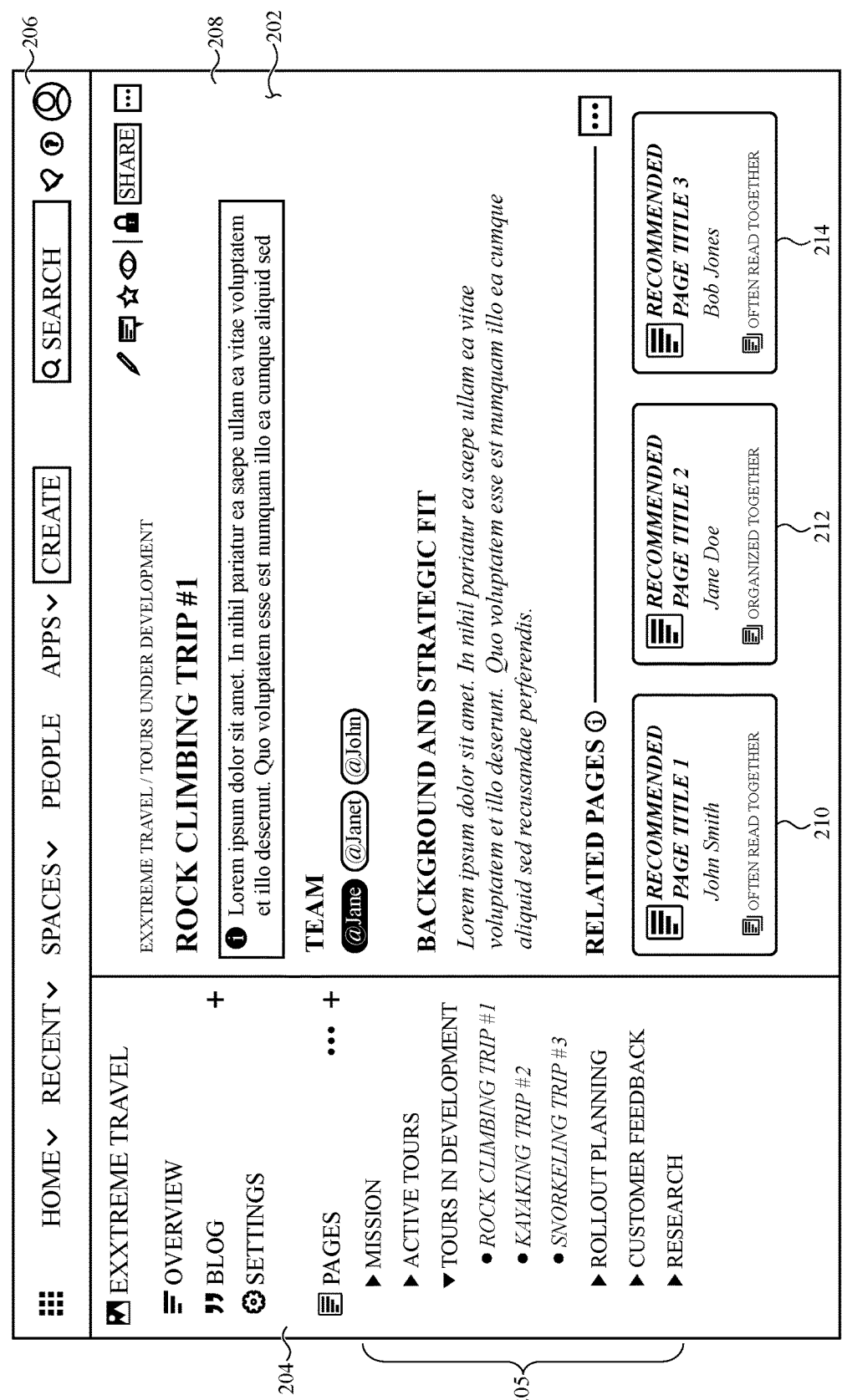
FIGS. 2A-2E depict example views of a graphical user interface.

The graphical user interface may allow the user to create, edit, or otherwise modify user-generated content that is stored as an electronic page or electronic document. Various examples in FIGS. 2A-2E depict a graphical user interface in an editor and/or a viewer mode. For example, a graphical user interface 200a shown in FIG. 2A is a rendering of an electronic document, page, or electronic content in a graphical user interface 200a. The electronic document, page, or electronic content may be rendered on a client device by the content collaboration service 104 upon authorization/authentication of the user by the authentication/authorization service 106, and based on permissions granted to the user as validated according to a user profile associated with the user. In one example, the graphical user interface 200a may have various partitions/sections displaying different content. For example, the graphical user interface 200a may include a navigational panel 204, a toolbar 206, and a content panel 208.

While the content (for example, the user-generated content) for reading or viewing by the user is displayed in the content panel 208, the page content 208 section may also display a set of candidate cards (or tiles) 210, 212, and/or 214 in which each card (or tile) may be selectable to navigate to, or may include a link to, an electronic document, page, or electronic content that is recommended to the user based on its relatedness score with the electronic document, page, or electronic content being currently displayed on the client device. In one example, a number of cards or tiles from the set of candidate cards (or tiles) displayed in the content panel 208 may be predetermined or user-configured. In yet another example, a user may horizontally scroll to access other cards (or tiles) from the set of candidate cards (or tiles) that are displayed in a carousel graphical element. By way of a non-limiting example, a total number of cards in the set of candidate cards may be limited to a predetermined number of cards. In the present example, the number of cards that are displayed is limited to 3 cards. In other implementations, the number of cards may fewer than 3 cards and in some implementations the number of cards may be greater than 3 cards. The documents having the highest relatedness score may be included in the set of candidate cards.

Accordingly, while a user is viewing the electronic document, page, or content on the client device, the system may cause the display of a set of recommendation cards or tiles 210, 212, 214, which correspond to respective documents or pages having content that is predicted to be relevant to the current page or document. Each card (or tile) of the candidate cards (or tiles) 210, 212, 214 may be selectable, and in response to a user input, a respective content associated with the card (or tile) may be displayed to the user in the content panel 208 of the graphical user interface 200a.

As shown in the graphical user interface 200a of FIG. 2, the recommendation cards or tiles 210, 212, 214 are displayed in a single row along the bottom of the page or document. In the current example, a short title section and line extending across the width of the content panel is used to visually distinguish the region including the recommendation cards or tiles 210, 212, 214 from the other user-generated content of the document or page. In some implementations, an authenticated user having edit permissions may reposition the recommendation cards or tiles 210, 212, 214 to another location within the user-generated content. As the specific recommendation cards or tiles 210, 212, 214 may change over time, the corresponding region may be considered a placeholder or designated region in which cards or tiles may be displayed, as selected in accordance with selection criteria.

In some implementations, the selection criteria includes an evaluation of a relatedness score for a set of candidate cards or tiles. In some cases, the relatedness score is a compound score that is based on both the location or proximity of a respective entry in the hierarchical element tree with respect to the current element and prior navigational events associated with the current page. In particular, pages or documents having a element that is more closely located to the current element in the hierarchical element tree have a higher relatedness score as compared to pages or documents having an element that is located further away or in another document space. Similarly, pages or documents that have been navigated to either immediately previously to or immediately subsequent to a viewing of the current page (by system users previously viewing the current page), may have an increased relatedness score as compared to pages or documents that have one or more intervening navigational events.

With reference to FIG. 1, the relatedness score and selection of candidate cards may be performed by the recommendation engine service 110 of the host server 102. The recommendation engine service 110 may access the content storage 108 to evaluate a particular page's proximity with respect to the current page in the hierarchical element tree. The recommendation engine service 110 may evaluate the number of navigational events between previous views of a particular page with respect to the current page using the event log module 112, which may store and manage user event records or data elements created in response to user activity on the content collaboration service 104. In some cases, the event log module 112 may also track user activity on one or more other services 116, which may also be used as a factor regarding the computation of the relatedness score.

The recommendation engine service 110 may also evaluate the content of respective pages or documents to identify keywords or to evaluate a similarity between the content of a respective page and the page being currently viewed.

Respective pages having content sharing a higher number of key words or phrases may have a higher relatedness score than pages having a fewer number of shared key words or phrases. Similarly, labels, tags, indexed keywords, or other data associated with respective pages, which may be evaluated with respect corresponding data associated with the currently viewed page.

The various factors or elements used to compute the relatedness score for a respective candidate card or set of cards may be assigned various weights depending on the implementation. In the present example, proximity of the element in the hierarchical element tree in combination with a number of navigation events are either used as the sole criteria or weighted higher than other criteria that are used to compute the relatedness score. This provides a recommendation that promotes similarly organized items along with items that are viewed together. This may bias the recommendations in a way that both helps the reader discover potentially related content while keeping the user within the organizational structure of the document space.

In the present example, the recommendation cards or tiles 210, 212, 214 are only displayed if they satisfy a permissions criterion with respect to an authenticated user viewing the page. As shown in FIG. 2A, the recommendation cards or tiles 210, 212, 214 are displayed with metadata or user-generated content extracted from the page or document. Specifically, in the present example, the document title, the document author(s), and an icon indicating a document type is presented in each respective recommendation card or tile 210, 212, 214. In some case, a brief document description or summary or a graphic from the user-generated content may also be displayed in the respective recommendation cards or tiles 210, 212, 214. Because information associated with the document is being displayed to the user, the system may only display recommendation cards or tiles 210, 212, 214 to which the authenticated user has at least view or access permissions. If the authenticated user does not have sufficient permissions with regard to a particular card or tile, the card or tile is removed from the set of candidate tiles and a next highest scoring card or tile may be used, if available. If the user has edit or author permissions with regard to the current document being viewed, the user may have additional options with regard to the displayed recommendation cards or tiles, as described in more detail below with respect to FIG. 2B.

As described in more detail below with respect to FIG. 4, the relatedness score may also be adapted or recomputed if the primary relatedness score fails to generate a sufficient number of results. In the present example, the system evaluates the number of available candidate cards or tiles that are available for display to a particular authenticated user and, if the number is less than a threshold (or greater than or equal to a threshold), the system may reevaluate or use a different relatedness score to identify or select the candidate cards. In general, one or more different relatedness score computational schemes may be used, which may expand the number of available results, as described in more detail below with respect to FIG. 4. If, after attempting to expand the number of candidate cards, there remains an insufficient number of cards (the number of cards fails the threshold criteria), then no cards or tiles may be displayed for that particular user on the current page.

As shown in FIG. 2A, the navigational panel 204 may include a hierarchical element tree 205 (also referred to herein as a page tree), which may be associated with a particular document space or content space. Each tree element shown in the navigational panel 204 may be displayed according to its respective hierarchical relationship to the current electronic document, page, or electronic content being displayed. Further, each tree element for the hierarchical element tree 205 may be selectable. In response to a user selection of a respective element of the hierarchical element tree 205, content of the respective page or document may be displayed in the content panel 208. The navigational panel 204 also includes items that may be selected in order to cause display of other user-generated content that is outside of the hierarchical element tree 205. Specifically, the navigational panel 204 includes an overview element that is selectable to cause display of space-overview content in the content panel 208, a blog element that is selectable to cause display of one or more respective blog entries in the control panel 208, and a settings element that can be used to access setting associated with the current page being viewed and/or the document space. In some cases, display of the navigational panel 204 may suppressed or hidden using a control provided in the graphical user interface 200*a*. Additionally or alternatively, the navigational panel 204 may be resized or slid all the way to the side of the graphical user interface in order to hide or suppress display of the navigational panel 204.

The page toolbar 206 may provide, to a user, various control options, including but not limited to, set or configure various restrictions for the electronic document, page, or electronic content that the user is creating/editing, to view or review recently accessed electronic documents. The page toolbar 206 may also include a search or query space for the user to enter one or more keywords to perform search for electronic documents, pages, or electronic content that may be related to the one or more keywords entered by the user. The page toolbar 206 may also include options for selecting a different document space, view recently viewed documents or pages, view people associated with the system or respective content, navigate or launch other applications, or view other aspects of the system.

Figure 2B:
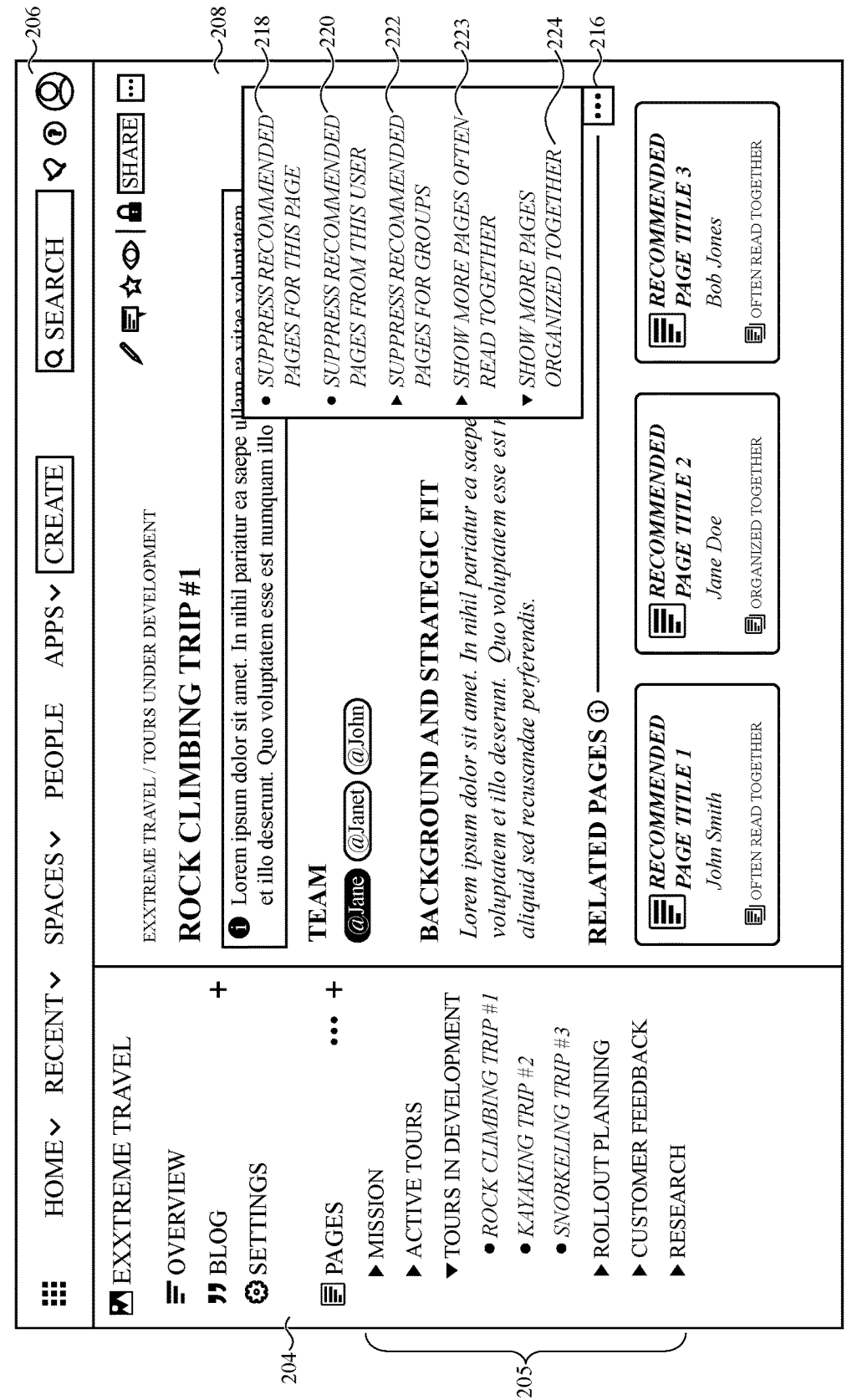

As shown in FIG. 2B, the graphical user interface 200*b* may also include control options that are displayed in response to an authenticated user having edit permissions for the electronic document, page, or electronic content being displayed in the content panel 208. The control options may include options that enable the user to edit the electronic document, page, or electronic content. A user having edit permissions for the electronic document, page, or electronic content being displayed in the content panel 208 may set or configure restrictions for the page as shown in graphic user interface 200*b* shown in FIG. 2B. For example, a control option, such as a view selection element 216 of the control options, may cause display of a configuration window with a list of selectable options that allow the user to set or configure whether the page can be included in a set of candidate cards, or whether a set of candidate cards may be recommended to one or more users accessing the current page. The user, for example, may set or configure page settings by expanding control options presented by ellipsis (" . . . ") or other view selection element 216 (or view control 216), and the user may set an option to not recommend related pages 218 for other system users. The user may also set an option to suppress recommendations of related pages 220 for all documents created by the user. The user may also set an option to suppress this page from being recommended 222 to one or more user groups. The user may select one or more user groups from a pull-down menu or a list. Also shown in the example of FIG. 2B, the user may also set various criteria for determining relatedness score for one or more electronic documents that may be related to this electronic document. Specifically, the list of options may include options 223, which allow the user to increase the relative weight of one or more factors used to compute the relatedness score. In some implementations, selection of a respective option may cause the system to rely on a single factor for computing the relatedness score (e.g., only consider pages often read together or only consider pages organized together).

In some cases, upon determining that the user has editing permissions for the page being displayed in the content panel 208, a view selection button or a view selection control option may be displayed. The view selection button or the view selection control option may allow the user, who may or may not be an author of the page, but may have edit permissions for the page, to determine which card of a set of candidate cards or a subset of candidate cards should be suppressed from being recommended to another user. Accordingly, this view selection button may help to identify and present to another user the most relevant cards of the set or candidate cards or subset of candidate cards.

Figure 2C:
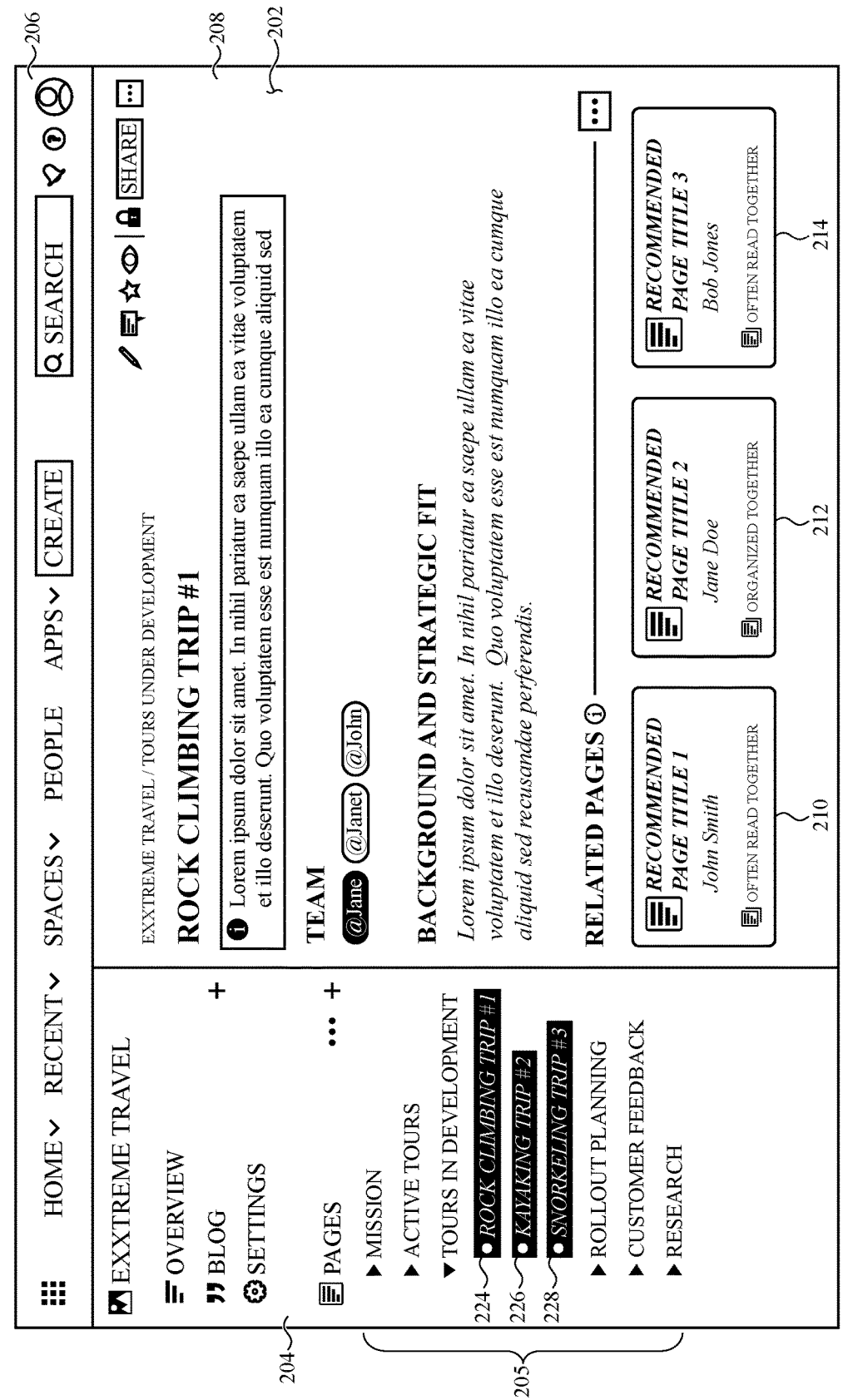
Figure 2D:
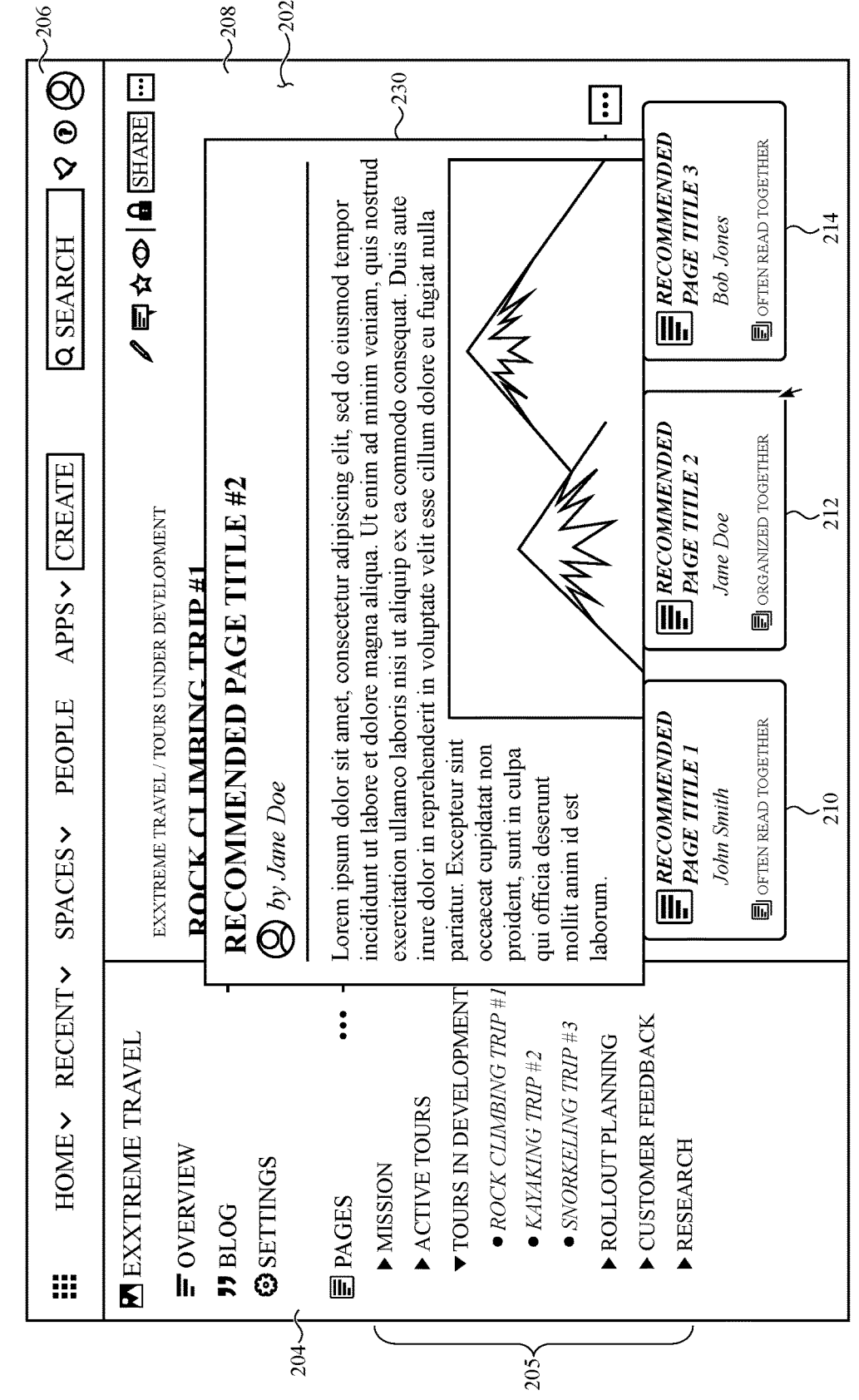

FIG. 2C depicts an example of how the structure of a corresponding hierarchical element tree 205 displayed in the navigational panel 204 of the graphical user interface 200*c* may influence the cards that are selected for display in the content panel 208. The content panel 208 is displaying page content of a page that corresponds the element 224 labeled "Rock Climbing Trip #1" 224. Entries adjacent to the element 224 ("Rock Climbing Trip #1") may be given a higher relatedness score as compared to other entries in the hierarchical element tree 205. As discussed previously, proximity of an entry of the respective electronic page in the selectable page tree with an entry of the page being currently displayed in the content panel 208 may be a factor used to compute the respective relatedness score for the corresponding card or tile. In the present example, the element 226 labeled "Kayaking Trip #2" and the element 228 labeled "Snorkeling Trip #3" may have a higher relatedness score as compared to other entries or tree elements of the hierarchical element tree 205. Thus, a card (or a tile) of a set of candidate cards (or tiles) or a subset of candidate cards (or tiles) may be associated with an electronic document, page, or electronic content corresponding to a tree element of the hierarchical element tree 205, and may have a relatedness score, which may increase with an increased proximity of the tree element with respect to the current electronic document, page, or electronic content being displayed in the content panel 208.

While proximity of tree element with respect to the current electronic document, page, or electronic content being displayed in the content panel 208 may be one criterion for determining the relatedness score, the relatedness score may be a product of many other factors, each given a different weightage for calculating the relatedness score. For example, a number of navigational events based on a sequence of navigation to another page after a user has viewed the current page, and/or navigation from another page to the current page, may be one factor for calculating the relatedness score. For example, if more users are visiting a particular page X after and/or before viewing the current page, a relatedness score for the particular page X may be higher in comparison to another page Y, for which may have more navigational events intervening between the viewing of page Y and the viewing of page X. Stated another way, for the pages visited by the user in a session, a page visited immediately before or after the current page may have a higher relatedness score in comparison with another page that has been not visited immediately before or after the current page. Accordingly, considering a viewing of an electronic document, page, or electronic content as the relevant navigation event, then a decreased number of navigation events between navigation to a particular electronic document, page, or electronic content and navigation to the current electronic document, page, or electronic content being displayed in the content panel 208 may result in an increased relatedness score for the particular electronic document, page, or electronic content.

The relatedness score for a respective page may also be influenced by the presence of a link or content associated with another application that is related to the current content. For example, a page related to, or including a link to, an issue or a ticket being managed by an issue tracking system may have an increased relatedness score if the current page is related to the same issue or ticket. By way of a non-limiting example, if the page is related to an issue that is related to the author or another user associated with the page displayed in the content panel 208, the respective page may have an increased relatedness score. In some cases, a page related to or including a link to an issue or ticket related to content displayed in the current page may have an increased relatedness score.

Other factors may also increase the relatedness score for a given page that may be based on user interaction with the respective content. For example, a page having a reaction, feedback, and/or comments from one or more other users may have a higher relatedness score in comparison with other pages. The one or more other users may be system users, which may or may not be related to the user (from being a member of the same user group, similar role in the organization, same location, and so on).

As shown in FIG. 2C, a corresponding recommendation card may include an indicia of the selection criterion that corresponds to the respective relatedness score. Specifically, cards 210 and 214 include an indicia that corresponds to a selection criteria based on the number of navigational events (e.g., "often read together). Card 212 includes an indicia that corresponds to a selection criteria based on the proximity or location of the respective element in a corresponding hierarchical element tree or page tree (e.g., "organized together").

Further, an amount of time spent by a user viewing a particular page may also be a factor in determining relatedness score for a page. Accordingly, an average time spent by the users on a page (or an average dwell time for a page) of at least some predetermined time duration (or threshold time) may have a higher relatedness score over another page where an average time spent by the users is less than the predetermined time duration. In other words, a respective relatedness score a page may increase or decrease based on activity on the page by a number of users. By way of a non-limiting example, the threshold time may be greater than ten seconds.

In some implementations, candidate cards or associated pages may be excluded from consideration if the average viewing time or dwell time is less than a predetermined threshold. For example, candidate cards having a dwell time less than 11 seconds may be excluded from the list of candidate cards. In some cases, candidate cards having a dwell time of 10 seconds or less may be excluded from the list of candidate cards. The average viewing time or dwell time may be measured, for example, over a rolling time period, which may include the previous week, previous month, previous 90 days or other predetermined amount of time. In some cases, the average viewing time or dwell time is reset to a set of default or preset values in order to refresh the computation of that factor.

In some cases, the page may have one or more labels, keywords, or tags associated with it based on the content. For example, a user who created the page may set one or more labels or tags to be associated with the page. In some cases, another user may set labels or tags based on their review of the page. In some cases, the content of the page may be analyzed to extract one or more keywords or phrases. In some cases, the page may be analyzed using a natural language processing tool including lemmatization, tokenization, or other technique to extract keywords or phrases from the page. The labels, tags, or keywords may be stored in the metadata of the page, or in the comments/feedback section of the page. The relatedness score for a page may then be determined based on a number of matching keywords or tags.

While various factors for determining the relatedness score are described herein, the list of factors for determining the relatedness score is only exemplary, and other factors or formulas may also be considered.

Based on the relatedness score calculated for various other electronic documents, pages, or electronic content as described herein, a set of candidate cards, including a predetermined number of cards, and/or cards having a relatedness score above a certain predetermined threshold, may be identified or determined. However, each user may not have access to all the electronic documents, pages, or electronic content, and accordingly, a subset of candidate cards from the set of candidate cards may be determined based on permissions criteria for each electronic document, page, or electronic content associated with each card, and permissions granted to a user as determined based on a user profile. Accordingly, it may also happen that documents having a higher relatedness score may be excluded from the subset of candidate cards while documents having a lower relatedness score may be included in the subset of candidate cards. The subset of candidate cards may then be displayed on the client device in content panel 208, for example, as cards 210, 212, and 214.

In some cases, when a number of cards in the subset of candidate cards are less than a certain predetermined number of cards, for example, two cards, then another set of candidate cards may be determined based on a respective relatedness score for each page. The respective relatedness score may be calculated without regard to a proximity of a page in the hierarchical element tree with respect to the current electronic document, page, or electronic content being displayed in the content panel 208. Alternatively, the respective relatedness score may be calculated without regard to a number of navigational events between navigation from/to a particular electronic document or page, and to/from the current electronic document or page being displayed in the content panel 208. A subset of candidate cards may then be determined from the other set of candidate cards based on permissions criteria for each electronic document, page, or electronic content associated with each card in the other set of candidate cards, and permissions granted to a user, as determined based on a user profile, with respect to the electronic document, page, or electronic content associated with each card. Upon determining that the subset of candidate cards includes more than the certain predetermined number of cards, for example, two cards, a portion of the subset of candidate cards may be displayed in the content panel 208.

As described herein, each card in the subset of candidate cards displayed on the client device may include a graphical element corresponding to a content type of the respective electronic document, page, or electronic content, and metadata for the respective electronic document, page, or electronic content. Each card in the subset of candidate card is selectable to navigate to a corresponding electronic document, page, or electronic content, or includes a link to navigate to a corresponding electronic document, page, or electronic content, as shown in a graphical user interface 200*d* of FIG. 2D. Accordingly, in response to a user input with respect to a card in the subset of candidate cards, an electronic document, page, or electronic content associated with the card may be displayed to the user as 230. The electronic document, page, or electronic content associated with the card may be displayed in the content panel 208 of the same or new instance of the graphical user interface. When the electronic page, document, or electronic content displayed as a result of user taking an appropriate action to visit the page of a card in the subset of candidate cards, the user may be asked to provide their feedback whether they found the page relevant or not. Accordingly, based on a number of users who found this page relevant, a relatedness score of the page may be improved.

Figure 2E:
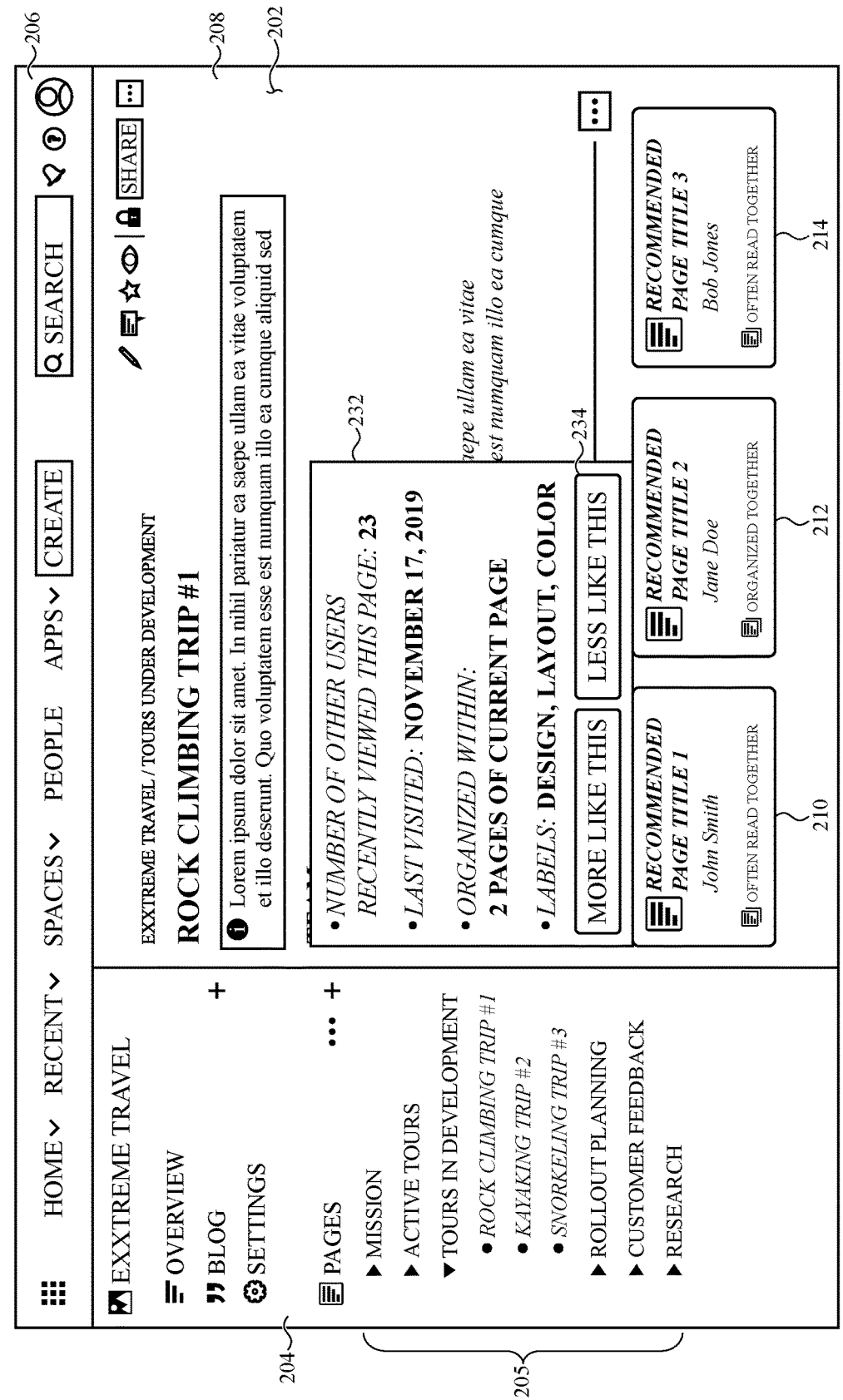

In some cases, as shown in a graphical user interface 200*e* of FIG. 2E, information related to an electronic document, page, or electronic content of each card of the subset of candidate cards may be displayed when a user hovers a cursor in a predefined area of the card, right clicks to inspect properties of the card, or provides another corresponding user input. For example, in response to corresponding user input, a window 232 is displayed which includes information related to an electronic document, page, or electronic content of a card. The information may include data regarding the number of users that recently viewed the page or found the page relevant, timestamp regarding the last visit, the structural relationship of the corresponding page with respect to the currently viewed page, any labels, tags, or keywords used in the selection of the respective card or tile, and other statistics or information that may be relevant to the card selection. In some cases, only pages having a threshold view time or dwell time may be included in the statistics displayed in the window 232.

In some cases, the window also includes user controls or selectable items that can be used to boost the relatedness score of the respective card. As shown in FIG. 2E, the window may include selectable options 234 for increasing the respective relatedness score of the corresponding card or decreasing the respective relatedness score of the corresponding card. Further, selection of the options 234 may also influence the selection of other cards by increasing or decreasing a weight of a particular factor used to compute the relatedness score based on a similarity to the card for which the option is being applied to. For example, if the current card was selected primarily based on navigational events (often read together), the navigational factor may be given an increased weight when computing the relatedness score of other cards. Further, pages having content, hierarchical element tree proximity, or other characteristics that are similar to the selected card may have an increased or boosted relatedness score in response to a user selection of the respective option 234. The selectable options 234 can also be used to de-emphasize or reduce the weight of various factors to result in fewer recommendations similar to the selected card.

FIG. 3 depicts a flow chart corresponding to example operations of a process performed using a content collaboration platform or other similar system, in accordance with some embodiments. As shown in a flow chart 300 in FIG. 3, at 302, a graphical user interface may be displayed on a client device of a user, for example, the client device 118, or 120. The graphical user interface may be displayed on the client device in response to receiving a request for accessing an electronic document, page, or electronic content by the content collaboration service 104. The graphical user interface displayed on the client device may, for example, be similar to a graphical user interface 200*a* shown in FIG. 2A. Accordingly, the graphical user interface may display a page including at least a hierarchical element tree having an array hierarchically arranged tree elements, such as a hierarchical element tree 204, and a content panel, such as the content panel 208. The content panel may display content, for example, user-generated content.

At 304, a set of candidate cards (or tiles) may be identified or determined by the recommendation engine service 110. Each card in the set of candidate cards may be associated with the electronic document, page, or electronic content being displayed to user at 302. Each card be selectable to navigate to an electronic document, page, or electronic content identified as relevant based on a relatedness score. Each candidate card (or tile) included in the set of candidate cards may be included based on a respective relatedness score of a page associated with the card. The respective relatedness score of the page may be calculated based on various factors described herein.

For example, the respective relatedness score of the page may be determined based on proximity of the page in the hierarchical element tree with the current page being displayed in the content panel 208, and a number of navigational events between navigation to the page and navigation to the current page being displayed in the content panel 208. An increase in the proximity, and/or a decrease in the number of navigational events may increase the respective relatedness score of the page. By way of further example, the respective relatedness score of the page may be determined based on proximity of the page in the hierarchical element tree with the current page being displayed in the content panel 208, and a number of matching keywords that are associated with the page and the current page being displayed in the content panel 208. An increase in the proximity, and/or an increase in the number of matching keywords may increase the respective relatedness score of the page.

At 306, a user profile associated with an user of the client device may be identified. As described herein, based on authentication/authorization of the user of the client device by the authentication/authorization service, a user profile associated with the user of the client device may be retrieved. As described earlier, the user profile may suggest permissions criteria for granting access to various electronic documents, pages, or electronic content to the user. For example, a user in certain groups may not have access to a specific electronic document, page, or electronic content, and according to the specific electronic document, page, or electronic content may not be presented to a user in a card included in the set of candidate cards.

At 308, from the set of candidate cards, a subset of candidate cards may be selected or identified by the recommendation engine service 110. Each card in the subset of candidate cards thus satisfy permissions criteria based on permissions identified in the user profile. At 310, if the subset of candidate cards includes at least a threshold number of cards (e.g., at least two cards), a portion of the subset of candidate cards may be displayed on the client devices based on the relatedness score for each card included in the subset of candidate cards. Each candidate card of the subset of candidate cards may be displayed as shown in FIGS. 2A-2E.

FIG. 4 depicts a flow chart corresponding to example operations of a process performed using a content collaboration platform or other similar system, in accordance with some embodiments. The process 400 of FIG. 4 can be used to improve the number of potential candidate card by changing the way in which cards are scored and selected. Specifically, if there is an insufficient number of cards for display as a result of the process 300 described above, with respect to FIG. 3, the process 400 of FIG. 4 can be used to implement a multi-tiered approach to scoring and ranking candidate cards.

At operation 402, a number of cards in a first subset of candidate cards may be identified. The operation 402 may be the result of operations 304 or 308 of process 300 described above with respect to FIG. 3. Specifically, the first subset candidate cards may be selected based on a first respective relatedness score that is based on both a proximity of a respective page element with respect to the current page element in the hierarchical element tree and a number of navigational events between the respective page and the current page based on a user event log. The set of candidate cards may, optionally, be further culled by selecting only those cards that satisfy a permissions criteria, as described above with respect to operation 308 of FIG. 3.

In operation 404, the number of candidate cards resulting from operation 402 is evaluated. In response to the number of candidate cards being greater than or equal to a threshold number, the set of candidate cards are displayed in the content panel of the graphical user interface in accordance with operation 416. Operation 416 corresponds to operation 310 described above with respect to FIG. 3. In responds to the number of candidate cards being less than the threshold number, the process 400 progresses to operation 406, which may reevaluate the candidate cards using a different relatedness score.

The threshold used for operations 404, 408, and 412 may depend on the implementation and, in some cases, may be the same threshold. Depending on the amount of space in the graphical user interface that may be used to display recommendation cards and the size of the recommendation cards may dictate the threshold number. In the present example, the threshold number is 2, which means if there is less than two candidate cards, a different relatedness score is used to select and/or rank the candidate cards. If there are 2 or more cards, the identified candidate cards may be displayed in accordance with operation 416.

At operation 406, a second subset of candidate cards may be selected or identified based on a second relatedness score that may be less restrictive than the first relatedness score used in operation 402. The second set of candidate cards, at 406, may be determined based on a second respective relatedness score that is calculated based on a number of navigational events between navigation to a particular page and navigation to the current page being displayed in the content panel 208. In order to potentially expand the number of results that are obtained, the second relatedness score may be computed without regard to proximity of the particular page in the hierarchical element tree with the current page being displayed in the content panel. In other words, pages that have been previously visited prior to or after viewing the current page may be used to determine the second set of candidate cards, without regard to whether the pages have elements that are proximate to the current page element in the displayed tree. Similar to as described previously, respective pages having fewer navigational events (either preceding or subsequent to) a viewing of the current page, may receive a higher relatedness score. Similar to previous examples, the second subset of candidate cards may be further culled based on the permissions profile associated with the authenticated user viewing the current page. Each card in the second subset of candidate cards may be required to satisfy permissions criteria based on permissions identified in the user profile. In some implementations, only those pages in which the authenticated user has at least view permissions may be selected as the second subset of candidate cards.

At operation 408, the number of results of operation 406 are evaluated with respect to a threshold number. In response to the number of results being equal to or greater than the threshold, the respective recommendation cards are displayed in accordance with operation 416. In response to the number of results being less than the threshold, the process progresses to operation 410 in which a different relatedness score is used to select and/or rank the candidate cards.

At operation 410, a third subset of candidate cards may be selected or identified based on a third relatedness score that may be less restrictive than other previously used relatedness scores. The third set of candidate cards, at 410, may be determined based on a third respective relatedness score that is calculated based on a location or proximity of the respective element in the hierarchical element tree with respect to a current page element. In order to potentially expand the number of results that are obtained, the third relatedness score may be computed without regard to navigational history of other pages. For example, the third relatedness score may be computed based on the proximity of the respective entry of the respective electronic page to the entry of the current electronic page and without regard to the number of navigation events. Similar to previous examples, the third subset of candidate cards may be further culled based on the permissions profile associated with the authenticated user viewing the current page. Each card in the third subset of candidate cards may be required to satisfy permissions criteria based on permissions identified in the user profile. In some implementations, only those pages in which the authenticated user has at least view permissions may be selected as the third subset of candidate cards.

At operation 412, the number of results of operation 410 are evaluated with respect to a threshold number. In response to the number of results being equal to or greater than the threshold, the respective recommendation cards are displayed in accordance with operation 416. In response to the number of results being less than the threshold, the process progresses to operation 414 in which the display of the cards is suppressed. In other words, if, after using various relatedness scores, an insufficient number of candidate cards are identified, no cards are displayed for the currently viewed page or document.

While the example process 400 includes specific example relatedness scores that may be used, other techniques for broadening the relatedness scores may be used. Similarly, while three different relatedness scores are used in the example process 400, fewer relatedness scores or more relatedness scores may be used, depending on the implementation. In some cases, the method for computing the relatedness scores and/or the threshold number of cards may be modified in accordance with a number of pages/documents managed by the system, the amount of user events that are available for analysis, or other factors that may impact the number of results that are available for selection.

FIG. 5 shows a sample electrical block diagram of an electronic device 500 that may perform the operations described herein. The electronic device 500 may in some cases take the form of any of the electronic devices described with reference to FIGS. 1, 2A-2E. 3, and 4, including client devices, and/or servers or other computing devices associated with the collaboration system 100. The electronic device 500 can include one or more of a processing unit 502, a memory 504 or storage device, input devices 506, a display 508, output devices 510, and a power source 512. In some cases, various implementations of the electronic device 500 may lack some or all of these components and/or include additional or alternative components.

The processing unit 502 can control some or all of the operations of the electronic device 500. The processing unit 502 can communicate, either directly or indirectly, with some or all of the components of the electronic device 500. For example, a system bus or other communication mechanism 514 can provide communication between the processing unit 502, the power source 512, the memory 504, the input device(s) 506, and the output device(s) 510.

The processing unit 502 can be implemented as any electronic device capable of processing, receiving, or transmitting data or instructions. For example, the processing unit 502 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 500 can be controlled by multiple processing units. For example, select components of the electronic device 500 (e.g., an input device 506) may be controlled by a first processing unit and other components of the electronic device 500 (e.g., the display 508) may be controlled by a second processing unit, where the first and second processing units may or may not be in communication with each other.

The power source 512 can be implemented with any device capable of providing energy to the electronic device 500. For example, the power source 512 may be one or more batteries or rechargeable batteries. Additionally, or alternatively, the power source 512 can be a power connector or power cord that connects the electronic device 500 to another power source, such as a wall outlet.

The memory 504 can store electronic data that can be used by the electronic device 500. For example, the memory 504 can store electronic data or content such as, for example, audio and video files, documents and applications, device settings and user preferences, timing signals, control signals, and data structures or databases. The memory 504 can be configured as any type of memory. By way of example only, the memory 504 can be implemented as random access memory, read-only memory, Flash memory, removable memory, other types of storage elements, or combinations of such devices.

In various embodiments, the display 508 provides a graphical output, for example associated with an operating system, user interface, and/or applications of the electronic device 500 (e.g., a chat user interface, an issue-tracking user interface, an issue-discovery user interface, etc.). In one embodiment, the display 508 includes one or more sensors and is configured as a touch-sensitive (e.g., single-touch, multi-touch) and/or force-sensitive display to receive inputs from a user. For example, the display 508 may be integrated with a touch sensor (e.g., a capacitive touch sensor) and/or a force sensor to provide a touch- and/or force-sensitive display. The display 508 is operably coupled to the processing unit 502 of the electronic device 500.

The display 508 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 508 is positioned beneath and viewable through a cover that forms at least a portion of an enclosure of the electronic device 500.

In various embodiments, the input devices 506 may include any suitable components for detecting inputs. Examples of input devices 506 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 506 may be configured to detect one or more particular types of input and provide a signal (e.g., an input signal) corresponding to the detected input. The signal may be provided, for example, to the processing unit 502.

As discussed above, in some cases, the input device(s) 506 include a touch sensor (e.g., a capacitive touch sensor) integrated with the display 508 to provide a touch-sensitive display. Similarly, in some cases, the input device(s) 506 include a force sensor (e.g., a capacitive force sensor) integrated with the display 508 to provide a force-sensitive display.

The output devices 510 may include any suitable components for providing outputs. Examples of output devices 510 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 510 may be configured to receive one or more signals (e.g., an output signal provided by the processing unit 502) and provide an output corresponding to the signal.

In some cases, input devices 506 and output devices 510 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 502 may be operably coupled to the input devices 506 and the output devices 510. The processing unit 502 may be adapted to exchange signals with the input devices 506 and the output devices 510. For example, the processing unit 502 may receive an input signal from an input device 506 that corresponds to an input detected by the input device 506. The processing unit 502 may interpret the received input signal to determine whether to provide and/or change one or more outputs in response to the input signal. The processing unit 502 may then send an output signal to one or more of the output devices 510, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method for recommending electronic content of a content collaboration platform, the method comprising:
   causing display of a page view graphical user interface of the content collaboration platform accessible via a client application on a client device, the page view graphical user interface of the content collaboration platform comprising:
      a content panel depicting user-generated page content of a current page, the user-generated page content editable within the content panel; and
      a navigational panel including a user-defined hierarchical element tree having an array of hierarchically arranged tree elements, each tree element having a hierarchical relationship to the current page and selectable to cause display of page content of a respective page in the content panel;
   identifying a set of pages different from the current page, the set of pages and the current page unique to a document space from a plurality of document spaces of the content collaboration platform;
   for each page of the set of pages, computing a relatedness score with respect to the current page, the relatedness score based on:
      a proximity determined by a relative position between a hierarchical tree element corresponding to the current page and a hierarchical tree element corresponding to the respective page; and
      at least one interaction determined based on user events with respect to one or more pages of the set of pages;
   generating a set of candidate cards for pages of the set of pages having a relatedness score that satisfies a relatedness criteria; and
   causing display of the set of candidate cards within the content panel of the current page, each displayed candidate card selectable to cause display of electronic content of the respective page within the content panel of the page view graphical user interface of the content collaboration platform.

2. The method of claim 1, wherein computing the relatedness score further comprises ranking the set of pages in accordance with the relatedness score.

3. The method of claim 2, wherein the set of candidate cards include two or more pages of the set of pages that have a highest ranking.

4. The method of claim 1, wherein the relatedness score is based on a number of navigational events between the current page and the respective page and further comprising:

identifying a user profile associated with an authenticated user of the client device;

extracting event logs associated with the user profile and unique to the user; and determine the number of navigational events based on data from the extracted event logs.

5. The method of claim 1, further comprising:

subsequent to authenticating a user of the client device, identifying each candidate card from the set of candidate cards that satisfy a permissions criterion, the permissions criterion based on at least view permissions of the page associated with each card; and in accordance with a first candidate card of the set of candidate cards failing the permissions criterion, suppress display of the first candidate card.

6. The method of claim 1, wherein:

each candidate card of the set of candidate cards comprises:

a graphical element corresponding to a content type of the respective page;

metadata of the respective page; and an indicia of a selection criterion corresponding to a respective relatedness score associated with the respective page.

7. The method of claim 1, wherein:

the relatedness score is based on the proximity and a number of navigational events between the current page and the respective page; and in response to a particular page having an average dwell time less than a threshold time, excluding a particular card associated with the particular page from the set of candidate cards.

8. A method for suggesting related content in a content collaboration platform, the method comprising:

causing display of a graphical user interface of the content collaboration platform accessible via a web browser on a client device, the graphical user interface of the content collaboration platform comprising:

a content panel configured to display electronic content of a current document, the electronic content editable within the content panel; and a navigational panel including a user-defined hierarchical element tree having an array of hierarchically arranged tree elements, each tree element having a hierarchical relationship to the current document and selectable to cause display of electronic content of a respective document in the content panel;

for a first document of a plurality of documents, computing a first relatedness score, the current document and the plurality of documents unique to a document space of a plurality of document spaces of the content collaboration platform, the first relatedness score based on:

a proximity determined by a relative position between a hierarchical tree element corresponding to the current document and a hierarchical tree element corresponding to the first document; and at least one interaction determined based on user events with respect to the first document:

in response to the first relatedness score satisfying a relatedness criteria, generate a first candidate card comprising user-generated content extracted from the first document; and causing display of the first candidate card within the content panel, the first candidate card selectable to cause display of electronic content of the first document within the content panel of the graphical user interface of the content collaboration platform.

9. The method of claim 8, wherein computing the first relatedness score further comprises:

extracting a number of navigational events from user event logs, the number of navigational events between the current document and the first document; and increasing the first relatedness score based on the number of navigational events having a decreased number of navigational events with respect to other documents from the plurality of documents.

10. The method of claim 9, wherein:

computing the first relatedness score is further based on a semantic similarity criteria between the current document and the first document; and the hierarchical relationship between the current document and the first document, and the number of navigational events are weighed higher than the semantic similarity criteria.

11. The method of claim 8, further comprising:

subsequent to authenticating a user of the client device, identifying a permissions profile of the authenticated user with respect to the first document; and in accordance with the authenticated user having editing permissions with respect to the current document, enabling a view control within the graphical user interface, the view control including a control to suppress the first candidate card from display within the graphical user interface.

12. The method of claim 8, wherein computing the first relatedness score further comprises one or more of:

extracting a number of reactions entered by system users on the first document;

extracting a number of comments entered by system users on the first document; and extracting an average time spent viewing the first document by a system user.

13. The method of claim 8, wherein:

the first candidate card is one of a first plurality of candidate cards;

the first relatedness score is one of a first plurality of relatedness scores, each first respective relatedness score associated with a respective first candidate card of the first plurality of candidate cards;

the method further comprises:

computing the respective relatedness score of each candidate card of the first plurality of candidate cards;

in response to the first plurality of candidate cards including less than two first candidate cards satisfying the relatedness criteria, identify a second plurality of candidate cards having a second respective relatedness score;

selecting from the second plurality of candidate cards, a second candidate card satisfying the relatedness criteria; and causing display of at least a portion of the second candidate card within the content panel.

14. The method of claim 8, wherein the first relatedness score is further based on the first document having a link to an issue of an issue tracking system.

15. A method for generating page recommendations in a content collaboration platform, the method comprising:

subsequent to authenticating a user of a client device, causing display of a graphical user interface of the content collaboration platform accessible via a client application on the client device, the graphical user interface of the content collaboration platform comprising:

a content panel depicting user-generated page content of a current page, the user-generated page content editable within the content panel; and a navigational panel including a user-defined hierarchical element tree having an array of hierarchically arranged tree elements and associated with a document space from a plurality of document spaces of the content collaboration platform, each tree element having a hierarchical relationship to the current page and selectable to cause display of page content of a respective electronic page in the content panel;

for a set of pages within the document space of the content collaboration platform computing a respective relatedness score, the set of pages unique to the document space from the plurality of document spaces, the respective relatedness score based on:

a proximity determined by a relative position between a hierarchical tree element corresponding to the current page and a hierarchical tree element corresponding to the respective page; and at least one interaction determined based on user events with respect to one or more pages of the set of pages;

ranking the set of pages according to the respective relatedness score; and causing display of a set of recommended cards corresponding to a respective page of the set of pages, the set of recommended cards displayed in accordance with the ranking.

16. The method of claim 15, wherein computing the respective relatedness score further comprises:

identifying a user profile associated with the authenticated user of the client device;

extracting event logs associated with the user profile and unique to the user;

compute a number of navigational events based on data from the extracted event logs; and increasing the respective relatedness score based on a decreased number of navigational events relative to another number of navigational events for a different page of the set of pages.

17. The method of claim 15, further comprising:

in response to a particular page having an average dwell time of less than a threshold time, the particular page is excluded from the set of recommended cards.

18. The method of claim 17 wherein the threshold time is greater than 10 seconds.

19. The method of claim 15, wherein each recommended card comprises:

a graphical element corresponding to a content type of the respective page;

metadata of the respective page; and an indicia of a selection criterion corresponding to the respective relatedness score.

\* \* \* \* \*